US008553067B2

(12) United States Patent
Shaffer et al.

(10) Patent No.: US 8,553,067 B2
(45) Date of Patent: Oct. 8, 2013

(54) CAPTURING AND CONTROLLING ACCESS TO MUTED CONTENT FROM A CONFERENCE SESSION

(75) Inventors: Shmuel Shaffer, Palo Alto, CA (US); Jochen Weppner, Belmont, CA (US); Shantanu Sarkar, San Jose, CA (US); Mukul Jain, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 658 days.

(21) Appl. No.: 12/828,625

(22) Filed: Jul. 1, 2010

(65) Prior Publication Data

US 2012/0002002 A1    Jan. 5, 2012

(51) Int. Cl.
*H04N 7/15* (2006.01)
*H04M 3/00* (2006.01)
*H04L 12/26* (2006.01)
*G06F 15/16* (2006.01)

(52) U.S. Cl.
USPC ......... 348/14.09; 348/14.01; 348/14.08; 348/14.16; 348/143; 348/386.1; 370/252; 370/260; 370/261; 379/203.01; 379/265.09; 386/241; 455/405; 455/412.2; 707/803; 709/224; 709/231; 715/759; 715/788; 718/103; 725/106; 725/151; 726/12

(58) Field of Classification Search
USPC ......... 348/14.08, 14.09, 143, 386.1, 14.01, 348/14.16; 370/252, 261, 260; 379/203.01; 379/265.09; 386/241; 455/405, 412.2; 707/803; 709/224, 231; 718/103; 725/106, 151; 726/12; 715/759, 788
See application file for complete search history.

(56) References Cited

U.S. PATENT DOCUMENTS

| | | | | |
|---|---|---|---|---|
| 5,544,300 A * | 8/1996 | Skarbo et al. | | 715/759 |
| 5,572,649 A * | 11/1996 | Elliott et al. | | 715/788 |
| 5,687,095 A * | 11/1997 | Haskell et al. | | 348/386.1 |
| 6,792,092 B1 | 9/2004 | Michalewicz | | |
| 6,915,331 B2 | 7/2005 | Fuller et al. | | |
| 7,043,008 B1 | 5/2006 | Dewan | | |
| 7,421,469 B1 | 9/2008 | Liu et al. | | |
| 7,464,137 B2 | 12/2008 | Zhu et al. | | |
| 7,489,773 B1 * | 2/2009 | Moran et al. | | 379/203.01 |
| 7,492,729 B2 | 2/2009 | Shaffer et al. | | |
| 7,590,230 B1 | 9/2009 | Surazski | | |
| 7,593,354 B2 * | 9/2009 | Surin et al. | | 370/260 |
| 7,975,285 B2 * | 7/2011 | Takegoshi | | 725/151 |
| 8,072,481 B1 * | 12/2011 | McNelley et al. | | 348/14.16 |
| 8,154,583 B2 * | 4/2012 | Kurtz et al. | | 348/14.16 |
| 8,159,519 B2 * | 4/2012 | Kurtz et al. | | 348/14.01 |
| 8,228,359 B2 * | 7/2012 | Hoory et al. | | 348/14.08 |
| 8,243,617 B2 * | 8/2012 | Jeong et al. | | 370/252 |
| 8,253,770 B2 * | 8/2012 | Kurtz et al. | | 348/14.01 |
| 8,310,520 B2 * | 11/2012 | Gopal et al. | | 348/14.08 |

(Continued)

*Primary Examiner* — Gerald Gauthier
(74) *Attorney, Agent, or Firm* — Edell, Shapiro & Finnan, LLC

(57) ABSTRACT

Techniques are provided for receiving multimedia from a plurality of endpoints participating in a conference session, including multimedia from an endpoint that was muted during the conference session. A muting state is detected at a particular endpoint during the conference session and the multimedia from the particular endpoint is recorded even though it is not forwarded and rendered to the other endpoints during the conference session. Information associated with the multimedia data for the conference session is stored to indicate the time period during which the muting state was detected at the particular endpoint. Techniques are also provided for granting access at a later time to the stored multimedia data for conference session, including access controls to the muted multimedia.

23 Claims, 9 Drawing Sheets

(56) References Cited

U.S. PATENT DOCUMENTS

| | | |
|---|---|---|
| 2005/0198096 A1 | 9/2005 | Shaffer et al. |
| 2006/0114884 A1 | 6/2006 | Remaker |
| 2007/0025335 A1 | 2/2007 | Patel et al. |
| 2008/0031161 A1* | 2/2008 | Osthus et al. ............... 370/261 |
| 2008/0232277 A1 | 9/2008 | Foo et al. |
| 2009/0068979 A1* | 3/2009 | Alston ......................... 455/405 |
| 2010/0149305 A1* | 6/2010 | Catchpole et al. ........ 348/14.08 |
| 2010/0162331 A1* | 6/2010 | Belz et al. ................... 725/106 |
| 2010/0306283 A1* | 12/2010 | Johnson et al. ............... 707/803 |
| 2011/0016204 A1* | 1/2011 | Wiener et al. ................ 709/224 |
| 2011/0074951 A1* | 3/2011 | Lehane et al. ................ 348/143 |
| 2011/0117886 A1* | 5/2011 | Travis et al. ................ 455/412.2 |
| 2011/0283009 A1* | 11/2011 | Martinez et al. ............. 709/231 |
| 2012/0002002 A1* | 1/2012 | Shaffer et al. .............. 348/14.09 |
| 2012/0027195 A1* | 2/2012 | Shaffer et al. ............ 379/265.09 |
| 2012/0030682 A1* | 2/2012 | Shaffer et al. ................ 718/103 |
| 2012/0128322 A1* | 5/2012 | Shaffer et al. ................ 386/241 |
| 2012/0204253 A1* | 8/2012 | Sugimoto et al. .............. 726/12 |

\* cited by examiner

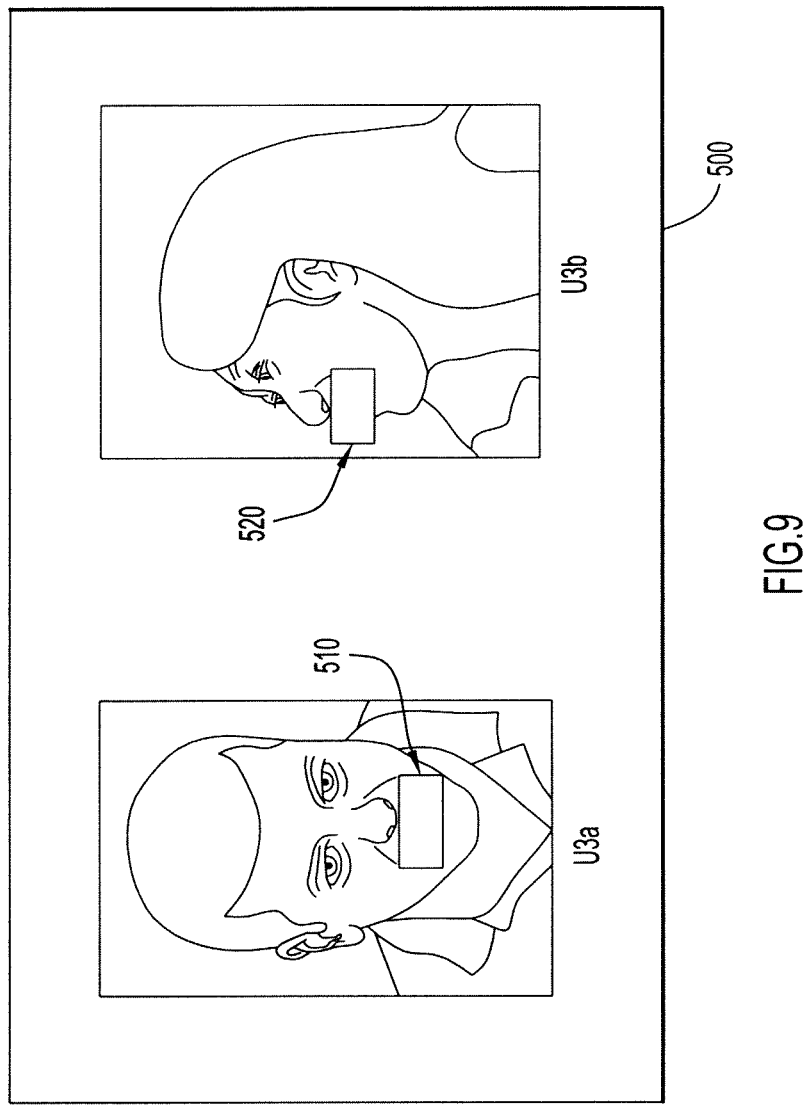

CAPTURING AND CONTROLLING ACCESS TO MUTED CONTENT FROM A CONFERENCE SESSION

TECHNICAL FIELD

The present disclosure relates to audio/video conference networks and to techniques for allowing access for participants of the conference to recorded multimedia data.

BACKGROUND

The use of video conferencing has grown substantially recently. Video conferencing enables persons at multiple locations to participate in a virtual face-to-face meeting. It is often desirable to record the audio and video associated with the meeting for later reference by one of the meeting participants and/or others that are not participants in the meeting. When an audio muting action is initiated at one of the conference endpoints, the audio from that conference endpoint is not sent to the conference server for distribution to the other conference endpoints in the meeting. This prevents, as desired by the muting action, the audio from that conference endpoint to be heard at the other conference endpoint. However, the muted audio is thereafter forever lost because existing conference and recording systems do not allow for recording of the muted content during a meeting.

BRIEF DESCRIPTION OF THE DRAWINGS

FIG. 9 illustrates an example of video data that is modified to obscure the movement of lips of participants in a conference session who are speaking during the time interval of the muted content.

DESCRIPTION OF EXAMPLE EMBODIMENTS

Overview

Techniques are provided to enable access to a recording of a conference session, and particularly a recording for a conference session in which a muting state is detected during the conference session. Multimedia is received from a plurality of endpoints participating in the conference session, and the multimedia is recorded and stored. A muting state, initiated at one or more of the endpoints, is detected. The muting state indicates that multimedia from a particular endpoint is not to be forwarded (and rendered) to the other endpoints but that the multimedia during the muting state at the particular endpoint is to be recorded. Information is stored that is associated with the multimedia data to indicate when the muting state was detected at the particular endpoint.

Access to the recorded content by participants to the conference session is enabled even if it was muted as long as those participants had privy to the muted content when it was originally made, i.e., those were the participants that participated in the muted exchange. Moreover, techniques are provided to prevent unauthorized participants from seeing video images that contain lips of the speakers in the recorded content when the muting action was initiated. Access privileges are based on those participants who had privy at the time of the original session, e.g., those participants who were at the conference endpoint will have access to the original recording because they were privileged to the exchange when originally muted. On the other hand, the participants at the other conference endpoints who were not privy to the muted exchange are not permitted to have access to the muted content. That said, techniques are also provided to enable a comprehensive authorization scheme whereby persons who did not attend the conference session or who would not otherwise have had access to the muted content during the conference session may be granted access privileges to the recording of the muted content.

Example Embodiments

Figure 1:
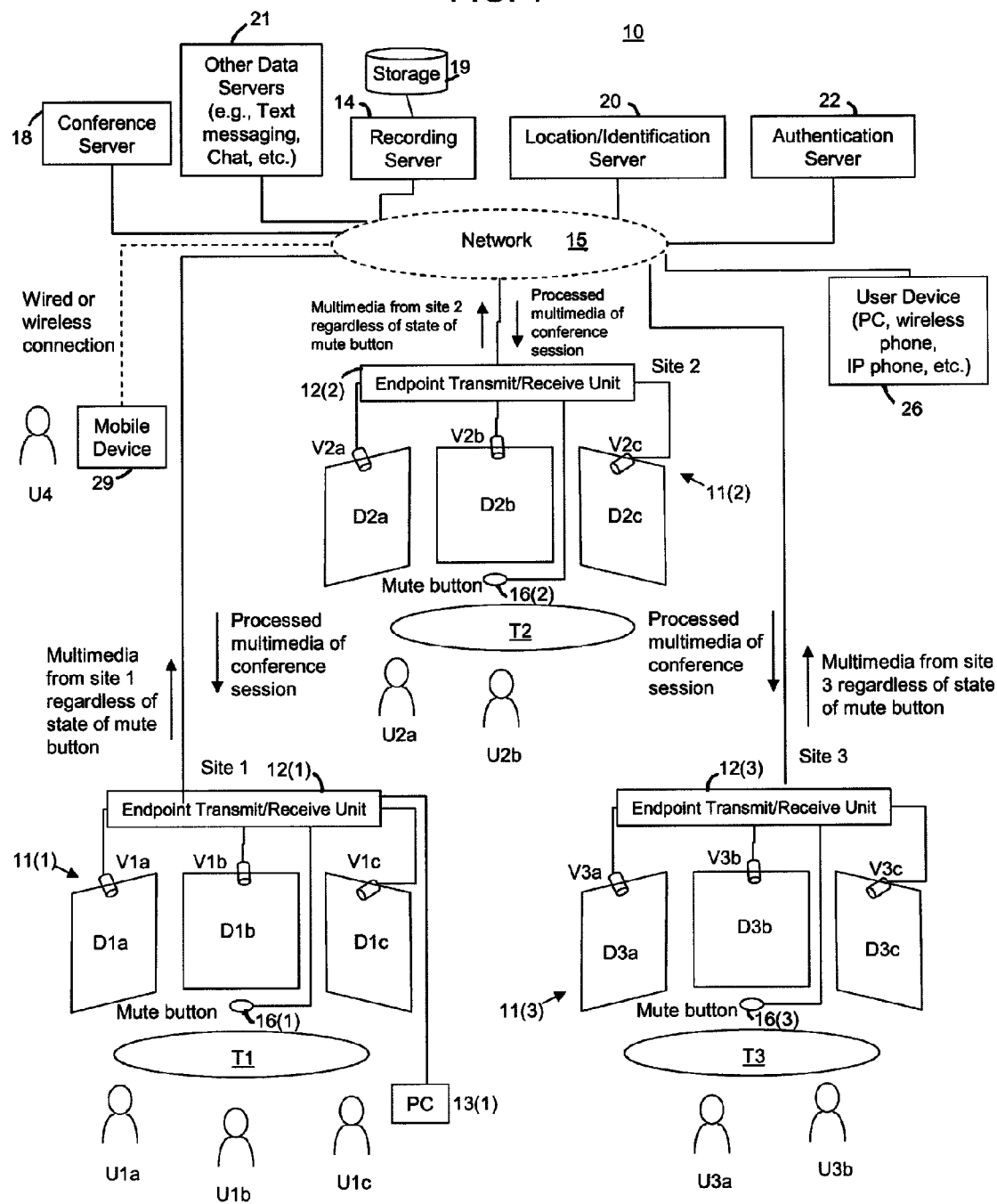
FIG. 1 is an example of block diagram of a conference system in which a recording server is configured to capture and store muted multimedia for subsequent playback to certain parties.

Referring first to FIG. 1, a conference system is shown at reference numeral 10. The system 10 comprises a plurality of endpoints 11(1)-11(3) capable of communicating with a recording server 14 from respective remote sites over a network 15, e.g., the Internet. Each endpoint 11(1)-11(3) comprises equipment to enable participation of one or more persons in a multimedia conference session.

The endpoints 11(1)-11(3) may be configured to participate in a conference session supported by any now known or hereinafter conferencing system and services, such as, for example, Cisco's Telepresence conferencing system.

The term "multimedia" as used herein is meant to refer to one or more of text, audio, still images, animation, video, and interactivity content forms. Thus, during a conference session, participants may speak to each other, see video of each other (contemporaneous with the voice audio), share documents or forms, share digital photograph images, animation content, etc.

Endpoint 11(1) at Site 1 is first described and endpoints 11(2) and 11(3) have similar configurations. Endpoint 11(1) comprises an endpoint transmit/receive (Tx/Rx) unit 12(1) that serves as the gateway point for inbound multimedia to endpoint 11(1) and for outbound multimedia from endpoint 11(1). Connected to endpoint Tx/Rx unit 12(1) is a plurality of audio/video (AV) capture units. For example, there are AV capture units V1a-V1c that are connected to endpoint Tx/Rx unit 12(1). Each AV capture unit V1a-V1c is, for example, a video camera with an integrated audio microphone, or the microphone for an AV capture unit is positioned proximate a focus position for the associated video camera where a person is expected to sit. In other words, there are three positions about a table T1 for participants U1a-U1c at Site 1. AV capture unit V1a is configured to capture audio and video from participant U1a, AV capture unit V1b is configured to capture audio and video from participant U1b and AV capture unit V1c is configured to capture audio and video from participant U1c. The endpoint Tx/Rx unit 12(1) is configured to encode and transmit the captured audio and video from each participant, as well as other data, collectively referred to as multimedia, from Site 1 over the network 15. Although the example described in connection with FIG. 1 shows a 1:1 association between specific video cameras and specific users this was is only by way of an example and it should be understood that other associations are possible.

In addition, endpoint 11(1) comprises video display screens or panels D1a, D1b and D1c connected to the endpoint Tx/Rx unit 12(1). These display panels are configured to display multimedia received and decoded by the endpoint Tx/Rx unit 12(1). Audio speakers are integrated into the display panels D1a, D1b and D1c to provide audio output for any audio in received multimedia at the endpoint 11(1). Separate non-integrated audio speakers may be provided at the endpoint and coupled to the endpoint Tx/Rx unit 12(1).

Further still, endpoint 11(1) comprises a personal computer (PC) 13(1) or other data device that is connected to the Tx/Rx unit 12(1). The PC 13(1) can supply other types of data that can be shared with the other endpoints during a conference session. Examples of such other types of data that may be supplied from the PC into a conference session include documents (text documents, text messages, presentation documents, audio content files, video content files, animation content files, etc.). The data may locally reside on the PC 13(1) or may be retrieved from a network to which the PC connects. The PC 13(1) may be a desktop computer, a laptop computer or a hand-held computing device, such as a Smartphone (e.g., an Iphone™). Multiple such devices may be connected to the Tx/Rx unit 12(1) to upload data to be shared during a conference session. In another form, the conference server 18 may monitor data exchanges (e.g., text messages, chat sessions, etc.) between participants at the same site and across sites by tracking activity from related text servers, chat servers, etc, which the participants use for these activities. These "other data servers" are shown in FIG. 1 at reference numeral 21. In this case, the conference server 18 and the recording server 14 are notified about data sessions between users who are participants in a conference session in order to obtain access to and record data associated with those sessions as part of the recorded multimedia for the conference session.

Endpoints 11(2) and 11(3) are similar to endpoint 11(1). Endpoint 11(2) at Site 2 comprises an endpoint Tx/Rx unit 12(2), AV capture units V2a, V2b and V2c, and display panels D2a, D2b and D2c. FIG. 1 shows that there are two participants at Site 2, U2a and U2b positioned around a table T2. Likewise, endpoint 11(3) at Site 3 comprises endpoint Tx/Rx unit 12(3), AV capture units V3a, V3b and V3c and display panels D3a, D3b and D3c. There are two participants at Site 3, U3a and U3b positioned around a table T3. There may be PC devices at Sites 2 and 3 similar to PC device 13(1) at Site 1, but for simplicity, they are not shown in FIG. 1.

There is also at least one mute button at the endpoint at each site. For example, there is a mute button 16(1) connected to the endpoint Tx/Rx unit 12(1) at endpoint 11(1). Similarly, there is a mute button 16(2) at endpoint 11(2) and a mute button 16(3) at endpoint 11(3).

A conference session involving Sites 1-3 is maintained by a conference server 18. During the conference session, each endpoint sends multimedia sourced from that site to the conference server 18. The conference server 18 processes the multimedia received from each of the endpoints, and generates and transmits separate streams to the other endpoints so that each endpoint receives the multimedia captured from the other endpoints. This is shown in FIG. 1 by the incoming arrow to each endpoint labeled "Processed multimedia of conference session".

When a conference session is to be recorded, the conference server 18 communicates with the recording server 14 to engage the recording resources of the recording server 14. When this occurs, the recorder server 14 will receive the multimedia from the endpoints participating in a conference session. The recording server 14 stores the recorded multimedia for a conference session at a local or remotely located storage unit 19.

FIG. 1 also shows a location/identification server 20 and an authentication server 22. The location/identification server 20 is a computing apparatus that is configured to determine the identities of the participants at each endpoint during a conference session. This is useful to later determine which persons have access to recorded content for a conference session. The authentication server 22 is a computing apparatus that is configured to verify that a person is truly the person he/she represents himself/herself to be when seeking access to recorded content for a conference session. A user, whether a conference participant or other individual, may seek access to recorded content for a conference session from a user device 26, such as a personal computer (PC), wireless mobile phone, Internet Protocol (IP) phone, Telepresence room, etc.

FIG. 1 also shows a mobile device 29, such as a wireless mobile phone, from which a user U4, remotely connects to the conference server 18 through a mobile communication service provider (not shown) which is also connected to the network 15. Thus, conference server 18 can support participation in a conference session from endpoint transmit/receive units and remote hand-held mobile units. It should also be understood that a standard landline phone also connects to the conference server 18 to enable participation in a conference session.

The functions of the conference server 18, location/identification server 10, and authentication server 22 may be incorporated or integrated into the functions of the recording server 14.

Figure 2:
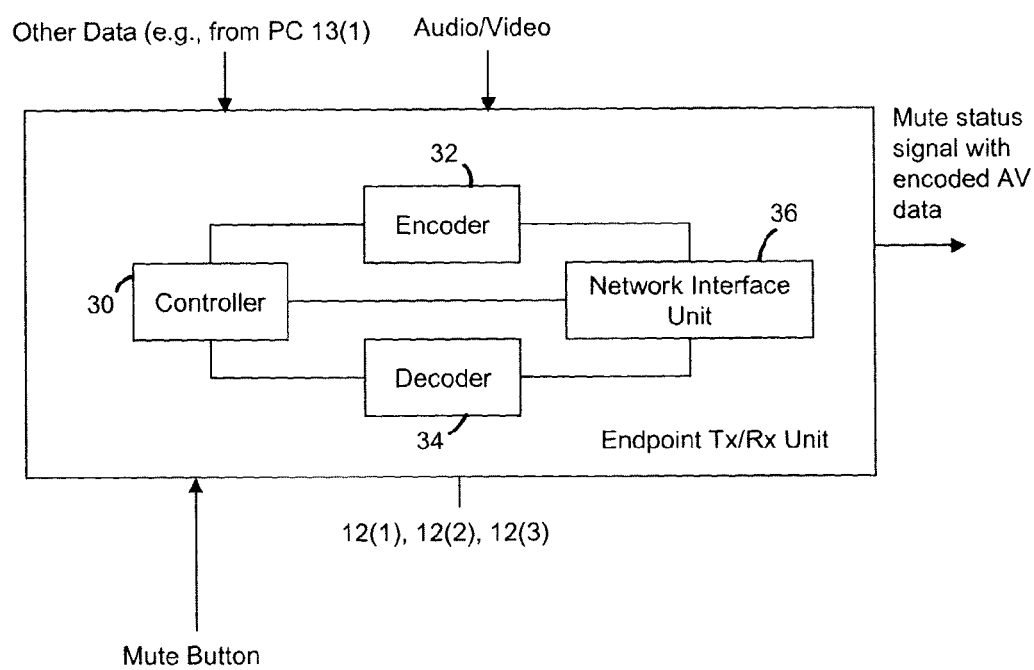
FIG. 2 is an example of a block diagram of an endpoint transmit/receive unit configured to send a mute status signal based on the state of a mute button at an endpoint.

Reference is now made to FIG. 2 for a more detailed description of the endpoint Tx/Rx unit 12(1)-12(3). Each endpoint Tx/Rx unit 12(1)-12(3) at the respective endpoints 11(1)-11(3) is configured to transmit encoded multimedia derived during a conference session to the conference server 18. Furthermore, each endpoint Tx/Rx unit 12(1)-12(3) is configured to send the outbound multimedia regardless of the state of the mute button at that endpoint. Likewise, each endpoint Tx/Rx unit is configured to receive encoded multimedia from the other endpoints, via the conference server 18, and to decode that multimedia for presentation at the endpoint. The conference server 18 (and recording server 14) will receive all multimedia from each endpoint even when a muting state is occurring (via the mute button) at that endpoint.

The endpoint Tx/Rx unit at each endpoint comprises a controller 30, an encoder 32, a decoder 34 and a network interface unit 36. Other components may be part of the endpoint Tx/Rx unit but those are omitted for the sake of simplicity. The controller 30 is the main control element of the endpoint and serves to generate appropriate control signals, when necessary, to the conference server 18 and recording server 14. The encoder 32 encodes multimedia (e.g., audio, video and other data) captured at an endpoint for transmission to the conference server 18, where it is processed and distributed to the other endpoints. The decoder 34 decodes encoded multimedia received from the conference server 18 for presentation at the endpoint, on the display panels and through audio speakers integrated into the display panels. The controller 30 also generates a mute status signal that is transmitted to the conference server 18 (and recording server 14) with the encoded multimedia data from an endpoint. The controller 30 generates the mute status signal to indicate when a muting action is invoked at an endpoint. For example, when the mute button at an endpoint is pressed, the controller 30 detects this event and puts the mute status signal in a first state (muted state) in which it takes on a first value (for example, digital "0") and when the mute button is not pressed (or has been pressed a second time), the mute status signal is in a second state (un-muted state) and takes on a second value (for example, digital "1"). The conference server 18 responds to the mute status signal and does not include in the processed stream to be delivered to other endpoints the multimedia from a particular endpoint while the mute status signal indicates that muting is occurring at that particular endpoint. The recording server 14 also responds to the mute status signal as described further hereinafter. The controller 30 also captures the identities of the participants at each endpoint and conveys this information to the location/identification server 20.

Figure 3:
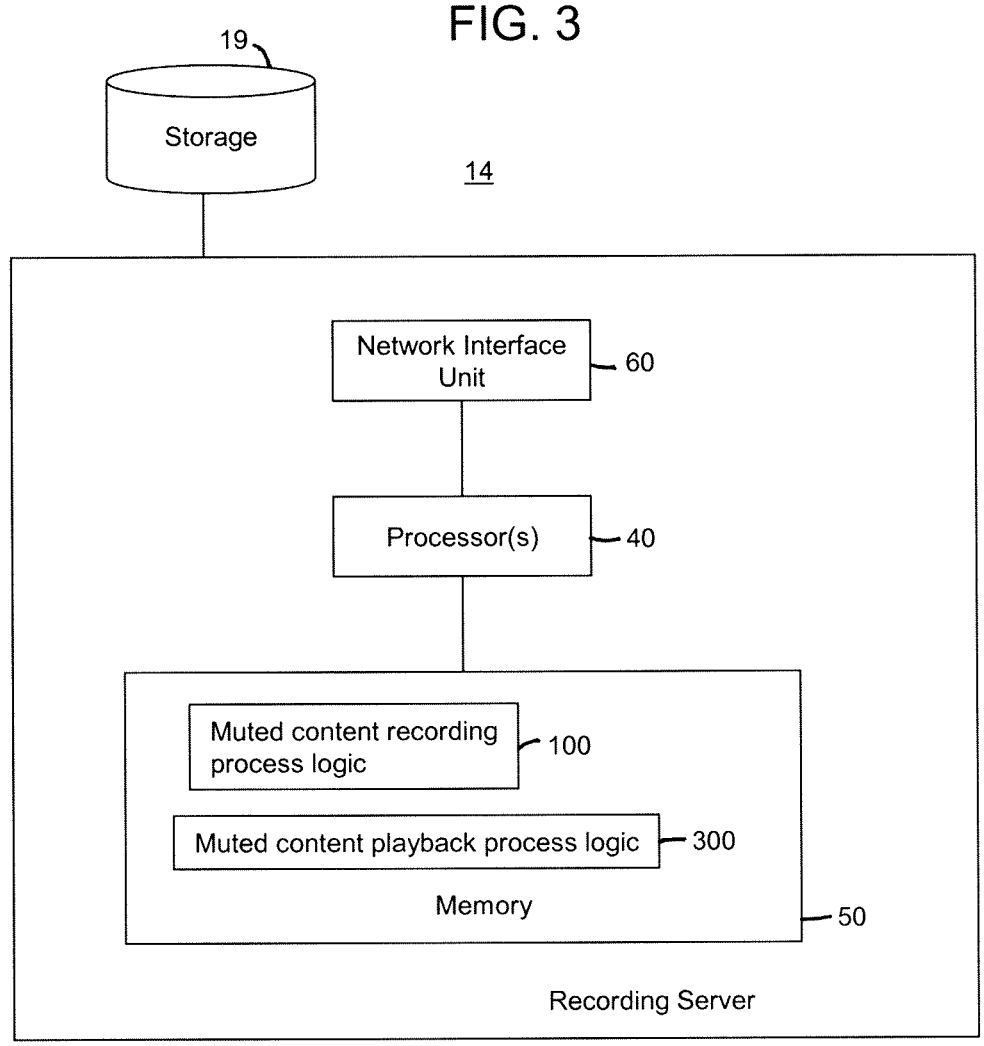
FIG. 3 is an example of a block diagram of the recording server configured with muted content recording process logic and muted content playback process logic.

Turning to FIG. 3, a block diagram of the recording server 14 is now described. The recording server 14 comprises a processor 40, memory 50 and a network interface unit 60. The network interface unit 60 is capable of receiving the multimedia from the plurality of endpoints via the network 15. The memory 50 is, for example, random access memory (RAM), but may comprise electrically erasable programmable read only memory (EEPROM) or other computer readable memory in which computer software may be stored or encoded for execution by the processor 40. The network interface unit 60 transmits and receives data via network 15. The processor 40 is configured to execute instructions stored in the memory 50 for carrying out the various techniques described herein. In particular, the processor 40 is configured to execute program logic instructions (i.e., software) stored in memory 50 for muted content recording process logic 100 and for muted content playback process logic 300. Generally, the muted content recording process logic 100 is configured to cause the processor 40 to record and store multimedia received from the network interface unit 60, to detect a muting state at a particular endpoint, and to store information associated with the received multimedia to indicate the muting state detected at the particular endpoint. The muted content playback process logic 300 is configured to cause the processor 40 to playback recorded content for a conference session, including muted recorded content, upon determining that the individual seeking access to the muted recorded content has access privileges to that content.

The operations of processor 40 may be implemented by logic encoded in one or more tangible media (e.g., embedded logic such as an application specific integrated circuit, digital signal processor instructions, software that is executed by a processor, etc), wherein memory 50 stores data used for the operations described herein and stores software or processor executable instructions that are executed to carry out the operations described herein. The muted content recording process logic 100 and muted content playback process logic 300 may take any of a variety of forms, so as to be encoded in one or more tangible media for execution, such as fixed logic or programmable logic (e.g. software/computer instructions executed by a processor) and the processor 40 may be an application specific integrated circuit (ASIC) that comprises fixed digital logic, or a combination thereof. For example, the processor 40 may be embodied by digital logic gates in a fixed or programmable digital logic integrated circuit, which digital logic gates are configured to perform the operations of the process logic 100 and process logic 300. In one form, the muted content recording process logic 100 and muted content recording process logic 300 are embodied in a processor or computer-readable memory medium (memory 50) that is encoded with instructions for execution by a processor (e.g. a processor 40) that, when executed by the processor, are operable to cause the processor to perform the operations described herein in connection with process logic 100 and process logic 300. Memory 50 may also buffer multimedia (voice, video, data, texting) streams arriving from the various endpoints as they are being transitioned into the storage 19.

Figure 4:
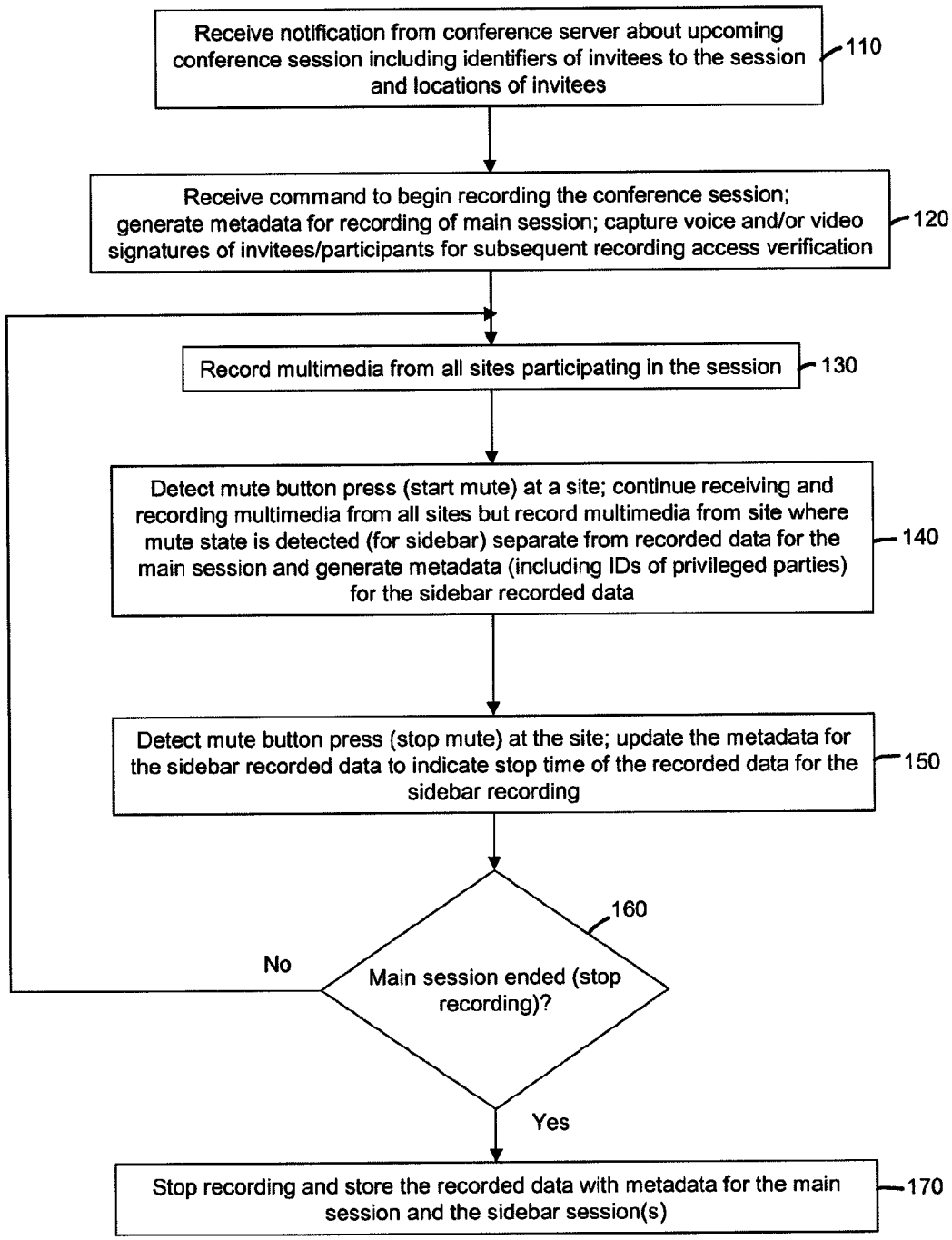
FIG. 4 is an example of a flow chart depicting the muted content recording process logic.

Turning now to FIG. 4, the muted content recording process logic 100 for recording and storing multimedia received from a plurality of endpoints is described. Generally, the operations of the process logic 100 are to receive at the recording server 14, a notification that a conference session has begun and a command to begin recording the multimedia of the conference session. When a muting state is detected, the recording server 14 records a sidebar recording for the duration of the muting state. The sidebar recording may be separate from a main session recording for the conference session. The sidebar recording contains multimedia from the endpoint where the muting state is detected. When the conference session has ended, the recording server 14 stops recording and stores the recorded multimedia data of the main session (main session multimedia data) and sidebar multimedia data for any sidebar sessions.

Specifically, at 110, the processor 40 receives a notification from the conference server 18 that a conference session has been initiated. The processor 40 receives information about the conference session, including the location of the endpoints and any identifiers of the participants and invitees to the conference session from the location/identification server 20. The identifiers may include identifiers, such as email addresses, corporate names or identifiers, Global Positioning System (GPS) location, Internet Protocol (IP) addresses of the participating endpoints, specific switch port number to which an endpoint is connected, etc., for each of a plurality of participants at each of the endpoints participating in the conference session, and the identifiers for the participants in the conference session are stored. At 120, the processor 40 receives a command to begin recording data of the conference session. The recorded data for the conference session is multimedia and may include any one or more of: audio data, video data, other data such as document presentations, text messages sent by participants, on-line chat sessions, still photographs, video presentations, audio clips, animations, or video presentations, etc., or any combination thereof. The data is recorded as a main session representing multimedia from the plurality of endpoints and excluding any multimedia that is muted at a particular endpoint during a conference session. Also at 120, processor 40 captures voice and/or video signatures for each of the participants and invitees to the conference session and generates metadata containing those signatures for the main session recording. In one example, the metadata for the main session recording is used for identifying the participants at each of the endpoints participating in the conference session so that these participants can then be granted access privileges to the main session recording at a later time. The main session metadata may also comprise information indicating (identifying) at least one user who is not a participant in the conference session. For example, in a corporate environment, the "supervisor" or "manager" of one or more of the meeting participants may be given access to the main session recording.

At 130, the processor 40 records multimedia from all endpoints participating in the conference session as a main session recording. At 140, when a muting state is detected, indicated by a state of a mute status signal received from a particular endpoint, the processor 40 continues to receive and record the multimedia from all of the endpoints participating in the conference session. Detection of a muting action at the particular endpoint thus indicates that the multimedia at the particular endpoint is not to be forwarded (and rendered) to the other endpoints participating in the conference session for a period of time, but that the multimedia at the particular endpoint during the muting state is to nevertheless still to be recorded. That is, the other endpoints will not receive multimedia from the particular endpoint where the muting state is detected. An exception to this may be when the conference session is a video conference session and to avoid distracting or suggesting to the other endpoints that there is a technical problem, the video only portion of the multimedia from the particular endpoint during the muting state may still be forwarded and rendered to the other endpoints. However, there are also techniques described herein in connection with FIG. 9 to still prevent the other endpoints from interpreting what a person is saying by "reading" lips of a person speaking at the particular endpoint during a muting state.

The processor 40 record the multimedia from the particular endpoint during the muting state in a sidebar recording that may be separate from the main session recording. In another example, when a muting state is detected at an endpoint the processor 40 continues to record the multimedia from all of the endpoint in the main session recording and the multimedia from the endpoint is undergoing the muting state may be designated as a sidebar recording but still within the main session recording. In other words, the muted multimedia may be stored within the same data file that stores the data for the main session.

A muting action may be initiated by a user pressing one or more mute buttons at an endpoint as described above in connection with FIGS. 1 and 2. Also at 140, the processor 40 generates metadata for the sidebar recording. The metadata for the sidebar recording indicates (identifies), for example, the participants at the particular endpoint that initiated the muting action as having access privileges to the sidebar recorded data. In one example, the metadata for the sidebar also identifies one or more persons that are not participants at the particular endpoint where the muting action occurred (and in fact may not be participants in the conference session at all) to have access to a portion of the recorded multimedia that was muted at the particular endpoint during the conference session.

At 150, the processor 40 updates the metadata for the sidebar recording when an un-muting action is detected based on the state of the mute status signal from the particular endpoint. In one example, muting may be terminated by a user pressing a mute button for a second time at the endpoint, which causes a change in state (to an un-muted state) in the mute status signal. The processor 40 updates the metadata information to indicate the stop time at which the un-muting occurred. Also at 150, the processor 40 stops recording the separate sidebar recording, but continues to record the main session recording. During the muted state the multimedia stream from the muted endpoint is not mixed with the multimedia streams from the other participants' multimedia streams by the conference server 18 (and consequently is not forwarded and rendered to the other participants). As the endpoint is un-muted, the multimedia stream from that endpoint is mixed with the other multimedia streams of all participants of the main session and consequently is forwarded and rendered to all other participants according to normal operations of the conference server 18.

At 160, the processor 40 determines whether the main session recording has ended. If the main session recording has ended, at step 170, the processor 40 stops the main session recording of the data from all the endpoints at all of the sites participating in the conference session. Though not shown in the flow chart, if the conference ends while a specific endpoint is in a muted state, the recording of the associated sidebar session terminates as well. Also at step 170, the processor 40 stores the recorded data for the main session recording and the sidebar recording along with the metadata for the main session recording and the sidebar recording. If the main session recording has not ended, the processor 40 continues to perform operations 130, 140, and 150 as described above until the main session recording has ended.

Figure 5:
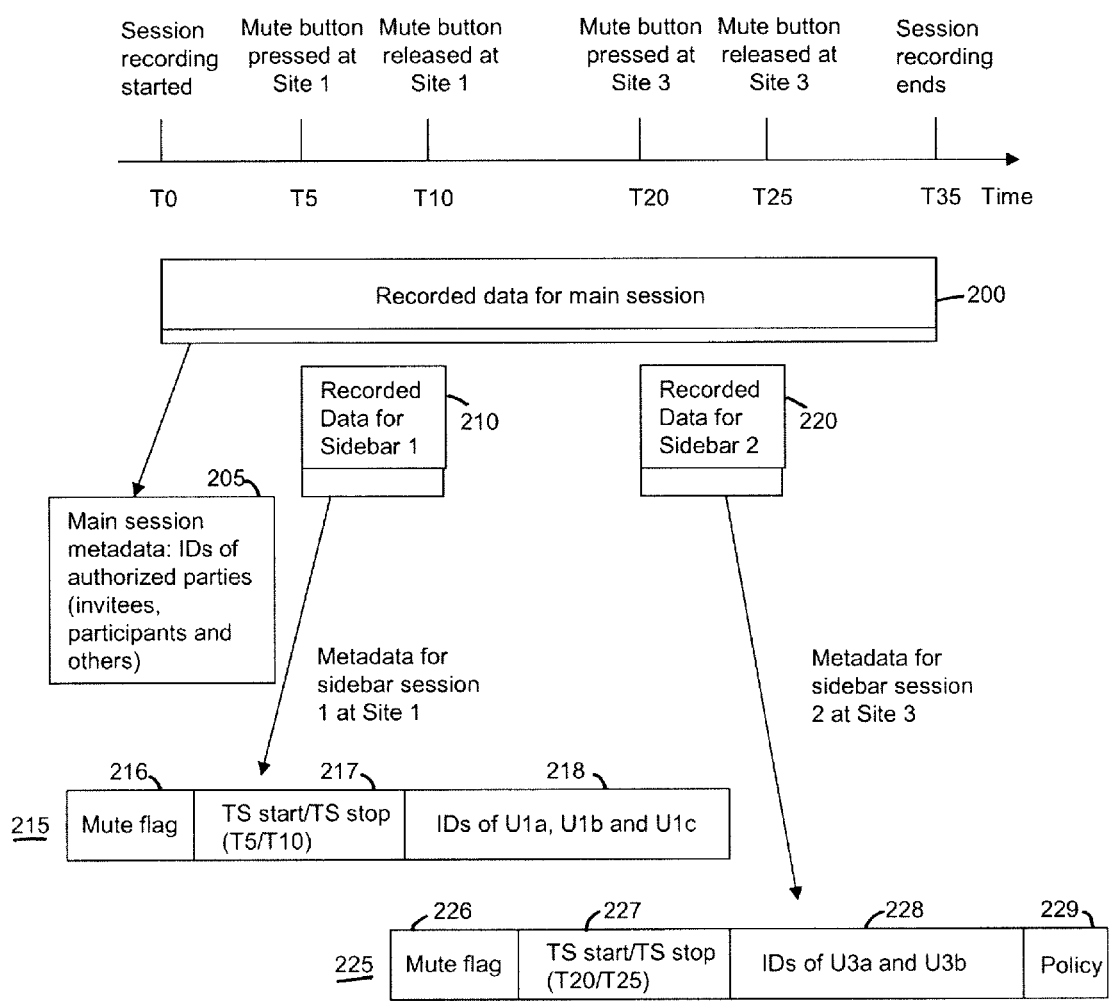
FIG. 5 is an example of a diagram showing a recording timeline with recorded data for a main session recording and recorded data for one or more sidebar recordings associated with muted content at a conference endpoint.

Reference is now made to FIG. 5. FIG. 5 depicts an example of a recording timeline with recorded data for a main session recording and recorded data for one or more sidebar recordings. Generally, the recorded data for the main session shown at reference numeral 200 lasts for the entire session duration, and the recorded data for the sidebars (shown at 210 and 220) last for the duration of time that the specific endpoints were in a muted state. For example, in FIG. 5, the conference session recording starts at time T0 (when the conference session begins) and ends at time T35 (when the conference session ends). During the conference session, muting is initiated (by pressing a muting button, for example) at Site 1 at time T5 and the muting is terminated at Site 1 at time T10. Thus, the recorded data during the muted state for the sidebar at Site 1 shown at reference numeral 210 occurs from T5 to slightly after T10 in order to accommodate the recording and storing of all associated metadata after the media recording terminates. During the conference session, a muting action is initiated by Site 3 at time T20 and is terminated at Site 3 at time T25. Thus, the recorded data for the muted multimedia for the sidebar at Site 3 shown at reference numeral 220 occurs from T20 to T25.

As stated above, the recorded data for the main session 220 may represent multimedia from the plurality of endpoints during the entire conference session excluding the multimedia muted at a particular endpoint during a muting state at the particular endpoint. Thus, in the example of FIG. 5, the recorded data for the main session 220 would contain the multimedia, e.g., audio, for all of the endpoints of the conference session from time T0 to time T35, but exclude the multimedia, e.g., audio, from Site 1 during the time period between T5 and T10 and also exclude the multimedia, e.g., audio from Site 3 during the time period between T20 and T25.

The recorded data for the main session 200, the recorded data for the sidebar 210 at Site 1, and the recorded data for the sidebar 220 at Site 3 each have metadata that is stored along with the recorded data. An example of the metadata for the main session recording is shown at reference numeral 205. The metadata for the main session recording may include identifiers of authorized parties to the main session recording. The authorized parties may include invitees to the conference session, participants of the conference session, and other individuals that are determined, a priori, to have access to the recording of the conference session, such as based on a corporate hierarchy, etc. An example of the metadata for the recorded data for the sidebar 210 is shown at reference numeral 215. The sidebar metadata 215 comprises a field 216 with a mute flag indicating that a muting state has occurred, a field 217 containing a timestamp (TS) start time and TS stop time to indicate the time that the muting state started and the time that the muting state ended, and a field 218 containing identifiers for the participants at the endpoint at Site 1 who are to have access privileges to the sidebar recording 210, e.g., participants U1a, U1b and U1c as shown in FIG. 1. Identifiers of other persons to have access to the sidebar recording 210 (such as an identifier of a supervisor) may be included in field 218. An example of the metadata for the recorded data for the sidebar 220 is shown at reference numeral 225. In accordance with another variation, the metadata may include a policy field 229 that indicates, for example, whether others in the management chain of any of the participants are to have access to this sidebar recording. Thus, in this example, a flag may be set in field 229 to indicate that access is to be granted to anyone in the management chain of the participant U1*a*, U1*b* and U1*c*. The metadata 225 comprises fields 226, 227, 228 and 229 that are similar to those described for metadata 215, but in this case identifies the start/stop times of the sidebar recording 220 and the identifiers of the participants at Site 3 where the sidebar discussion took place, e.g., participants U3*a* and U3*b* as shown in FIG. 1.

While FIG. 5 shows that the sidebar recorded data are separate from the main session recording, this is only an example. In another form, the sidebar recorded data are contained within the main session recorded data and the metadata for the main session multimedia data will also indicate the various sidebar sessions that are included within the main session recorded data. Thus, in this variation, one set of metadata is used to indicate the participants and users who have access to the main session data and the participants and users who have access to respective sidebar session data contained within the main session data.

When muting occurs at an endpoint, all media that is exchanged between the participants at that endpoint during the muting state is "muted" or in other words, not forwarded and rendered to the other endpoints, but it is still recorded. For example, if the participants talk to each other, open up a document and talk about it, present a video clip to each other, or text each other, all of that is "muted" and not forwarded and rendered to the other endpoints. However, during a conference session that involves video of the participants, blanking out the video during a muting state may not be desirable because it a "blank" video display of the particular site at the other sites may cause the participants at the other sites to think there is a problem with the video conferencing system or with his display. Thus, when the conference session involves video of the participants, the muting state may be performed discretely so that the video from the particular endpoint where the muting state is detected is still displayed to the other endpoints, but the voice, text, and other data between the participants at the particular endpoint is not forwarded to the other endpoints, thought it is still recorded.

Figure 6:
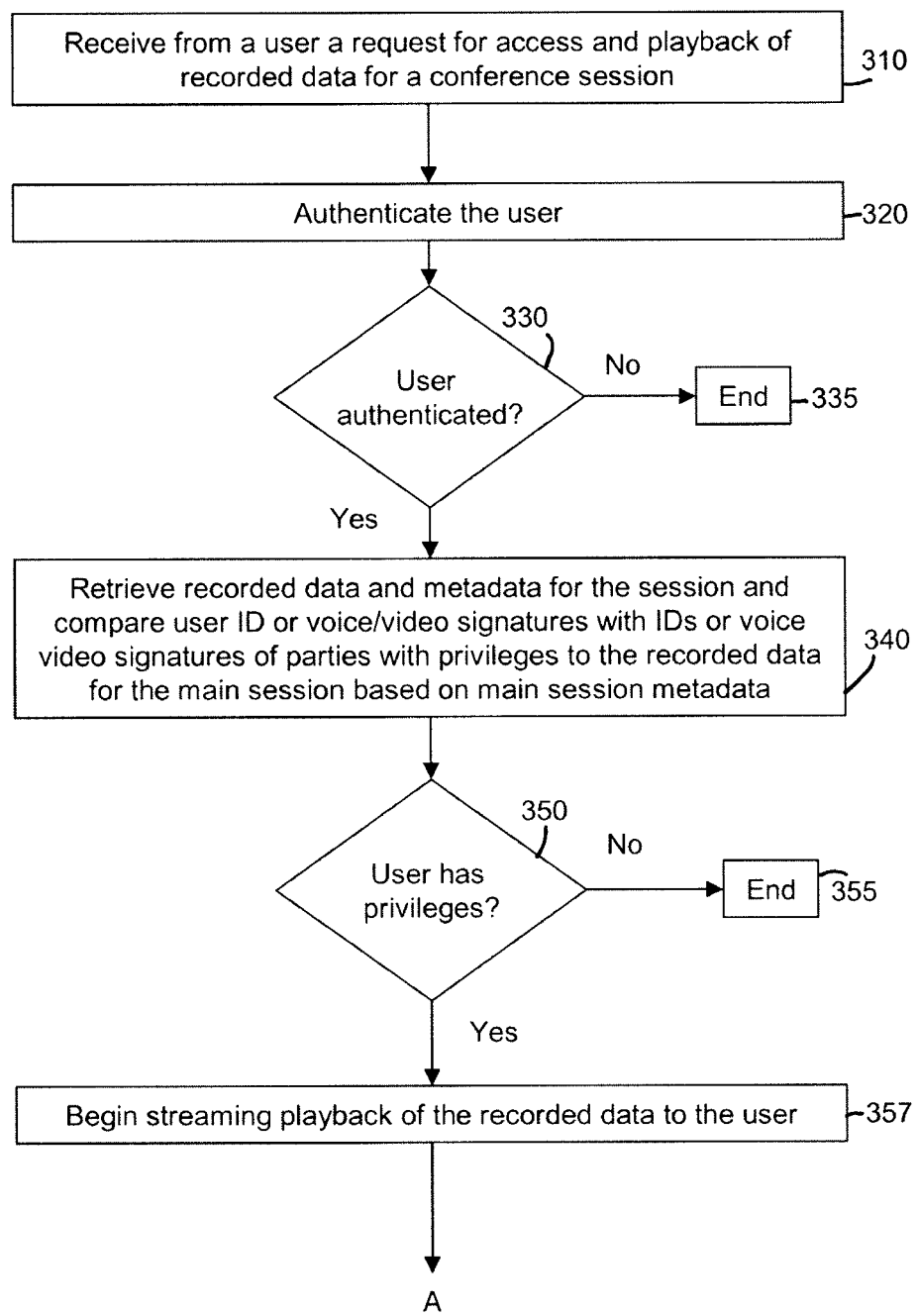
FIGS. 6 and 7 show an example of a flow chart depicting the muted content playback process logic.
Figure 7:
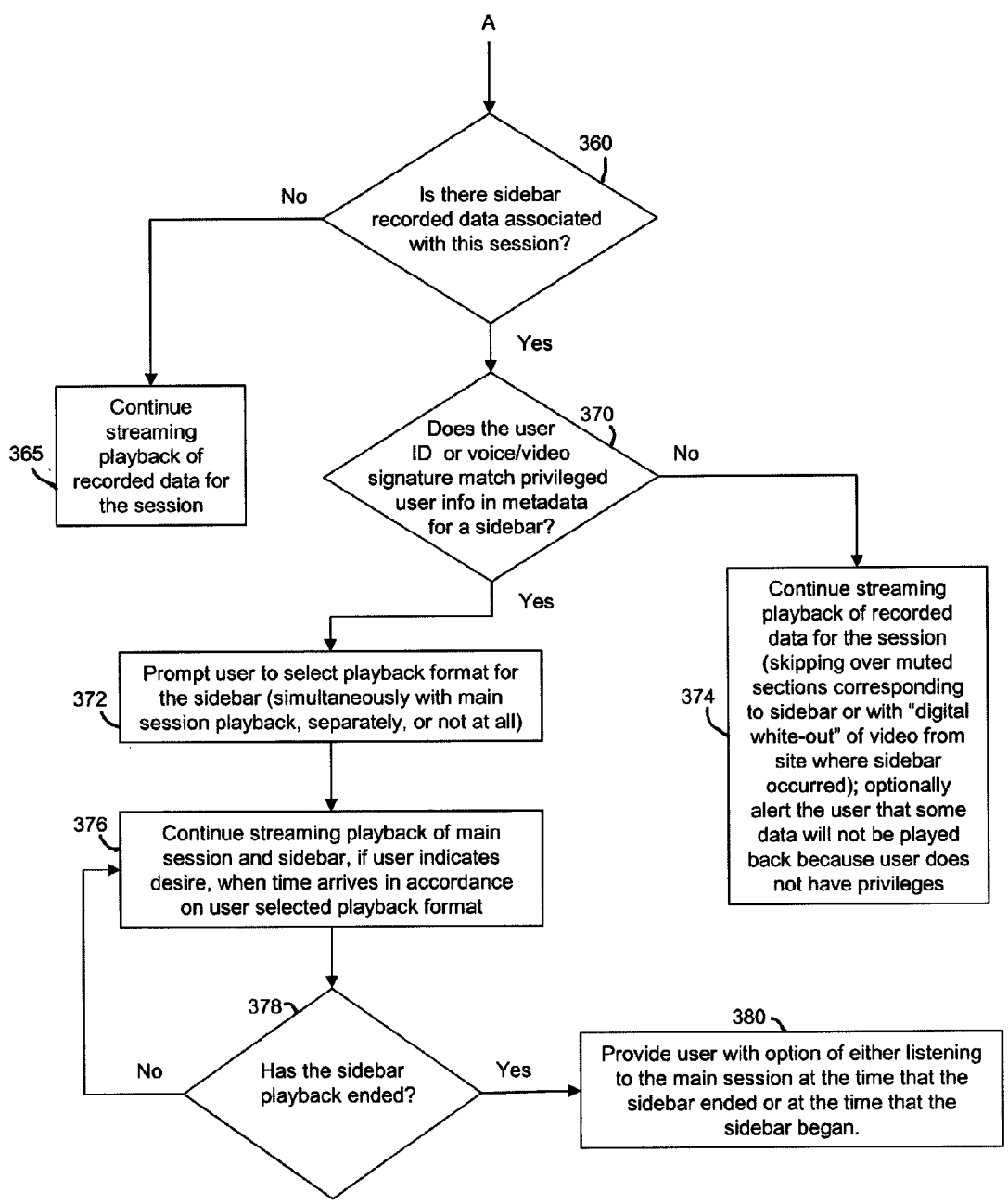

Turning now to FIGS. 6 and 7, the muted content playback process logic 300 for playing back stored multimedia data is described. Generally, the operations of the process logic 300 are to receive at the recording server 14 a request from a user to play back recorded data for a conference session. An authentication process occurs to verify that the user is who he/she says he/she is, and to determine whether the user has privileges to the main session recorded data and any sidebar recordings. The recordings to which the user has privileges will be played back to the user. The recordings to which the user does not have privileges will not be played back to the user.

Specifically, at 310, the processor 40 receives a request from a user for access and playback of data that has been recorded by the recording server 14 during the conference session. The user may request access to the recording for a particular conference session by supplying identification information for the particular conference session (assigned at the time of the recording and made available to the participants) for example. As shown in FIG. 1, a user may send a request for access to recorded data for a conference session from a user device 26 via the network 15, for example, by logging into a website that is designed to provide a user interface to the recording server 14. At 320, the processor 40 authenticates the user making the request to verify that the user is actually who he/she represents that he/she is. To this end, the recording server 14 communicates with the authentication server 22 for authenticating a user based on a user identifier and password received from the user. The authentication server 22 will send a token or other indication that the user is authenticated and when the recording server 14 receives this, it determines at 330 that the user has been authenticated. If the user has not been authenticated, the processor 40 terminates the user's request for access and playback at 335. If the user has been authenticated, at 340, the processor 40 retrieves the data for the main session recording and the metadata associated with the main session recording.

At 340, the processor 40 compares the identifier or audio/video signature associated with the user requesting access with the identifiers or audio/video signatures of those persons with privileges to the recorded data contained in the metadata for the main session recording of the conference session. This is the metadata stored at 170 in FIG. 4 and described above in connection with FIG. 5. At 350, the processor determines whether the user has the privileges to access the recorded main session data based on the comparison performed at 340. If the user does not have privileges because his/her identifier or signature does not match that contained in the metadata for the main session recording, the processor terminates the user's request for access at 355. If the user does have privileges because a match is found, the processor 40, at 357, begins streaming the playback of the recorded main session data to the user.

Continuing to FIG. 7, once the processor 40 begins streaming the playback (rendering) of the main session recording to the user, the processor 40 at 360 determines whether or not there is a sidebar recording associated with the conference session. If there is no sidebar recording associated with the conference session, the processor 40 continues streaming (rendering) the playback of the recorded data of the main session to the user, as shown at reference numeral 365. If there is a sidebar recording associated with the conference session, the processor 40, at reference numeral 370, determines whether the user identifier or audio/video signature matches the information corresponding to the privileged user information that is contained in the metadata information for the sidebar recording. If the user identifier or audio/video signature does not match the information for users who are to have access to the sidebar recording, then at 374, the processor 40 continues streaming the playback of the recorded data for the main session without the recorded multimedia data for the sidebar. For example, during the playback, the processor 40 may skip over the muted section entirely (the audio, video, text messages, or any other media for the muted section) or may display the video for that portion with certain areas of the frames for the video from the site where the sidebar occurred digitally "whited-out" to obscure the movement of lips of one or more participants who are speaking during the time interval of the muted audio. The concept of digital "white-out" of a portion of a video frame is described hereinafter in connection with FIG. 9. Additionally, at 374, the processor 40 alerts the user that some of the recorded multimedia data will not be played back because the user does not have privileges to the sidebar recording.

If the user identifier or audio/video signature matches (or more generally satisfies) the information corresponding to the users who are to be permitted access to the sidebar recording, then at 372, the processor 40 prompts the user to select the playback or rendering format for the sidebar recording. A person who is granted access may be someone other than those persons who participated in the muted section, as described above. For example, the processor 40 plays back or renders the sidebar multimedia data to the user simultaneously with rendering of the main session multimedia data, or renders the sidebar multimedia data separately from rendering of the main session multimedia data, or does not render the sidebar multimedia data to the user. At 376, the processor 40 continues to stream (render) the playback of the main session and the sidebar based on the user selected playback format. At 378, the processor 40 determines whether the sidebar playback has ended. If playback of the sidebar recording has ended, then the processor 40 at 380 provides the user with the various options for continuing to be playback the main session recording. For example, the user can select for playback or rendering of the main session recording either at the time that the sidebar ended or at the time that the sidebar began. If the sidebar playback or rendering has not ended, then the processor 40 continues to stream the playback of the main session and the sidebar based on the user selected playback format, as shown in 376. The term "rendering" is used herein to refer to playback or other types of presentations of recorded multimedia.

Figure 8:
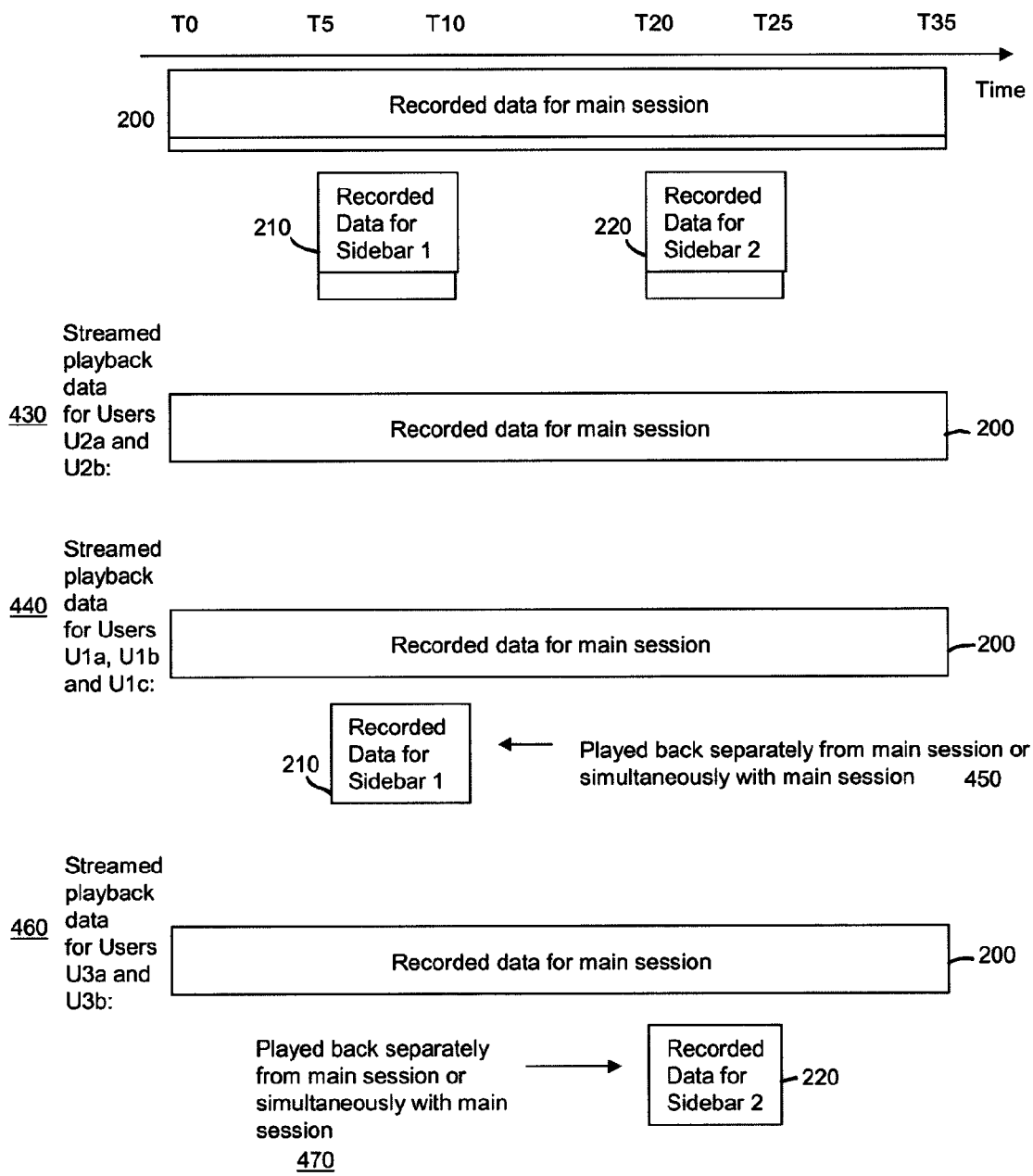
FIG. 8 is an example of a diagram showing a playback timeline for playback of the recorded data for a main session and the recorded data for one or more sidebars.

Reference is now made to FIG. 8. FIG. 8 depicts an example of a playback timeline for recorded data for the main session and recorded data for the one or more sidebar recordings. In one example, the recorded data for the main session is maintained separate from the recorded data for the sidebars. In another example, the main session recording contains the recorded data for the sidebars, but the processor 40 does not play the recorded data of the sidebars to users do not have access privileges to the recorded data.

For example, the recorded data for the main session 200, the recorded data for the sidebar 210 and the sidebar 220 shown in FIG. 5 are again shown in FIG. 8. At 430, since users U2a and U2b (from FIG. 1) were participants in the conference session but were not participants in any sidebar recordings, that is, muting occurred as to other endpoints but not at the endpoint at Site 2 where users U2a and U2b were located, the recorded data for the main session is played back for the users U2a and U2b. The users U2a and U2b do not have identifiers or audio/video signatures that are contained in the metadata of sidebar 210 and sidebar 220, and thus the users U2a and U2b are only privileged to receive a streamed playback of the recorded data for the main session 200 without any sidebar data.

At 440, the recorded data for the main session is played back for the users U1a, U1b, and U1c, shown in FIG. 1, located at the endpoint at Site 1. At 450, the recorded data for sidebar 210 is also played back to users U1a, U1b, and U1c since these users have identifiers or audio/video signatures that match data contained in the metadata for sidebar 210. At 450, the users U1a, U1b, and U1c may select to receive the playback of the recorded data for sidebar 210 in various ways, for example, separately from the main session recording or simultaneously with the main session recording. Users U1a, U1b, and U1c are not privileged to receive playback of the recorded data sidebar 220 because these users do not have the identifiers or audio/video signatures which match that access information for the sidebar 220.

At 460, the recorded data for the main session is played back for the users U3a and U3b, shown in FIG. 1, located at the at Site 3. At 470, the recorded data for sidebar 220 is also played back to users U3a and U3b since these users have identifiers or audio/video signatures which match the access information contained in the metadata for sidebar 220. At 460, the users U3a and U3b may select to receive the playback of the recorded data for sidebar 220 in various ways, for example, separately from the main session recording or simultaneously with the main session recording. Users U3a and U3b are not privileged to receive playback of the recorded data for sidebar 210 because these users do not have the identifiers or audio/video signatures which match the access information for sidebar 210.

FIG. 8 illustrates an example in which participants have access to recordings of a conference session, where only those participants who were part of a conference session or sidebar session have access to the conference session or corresponding sidebar session. However, it is also possible that access privileges may be granted to persons that were not participants in the conference session itself. The metadata for a recording (both to the main session recording and sidebar recordings) may be configured to allow access to other individuals in accordance with information in the aforementioned replay policy, e.g., managers of any one or more participants in the conference session. For example, if user U1a is a participant of a conference session, then the manager for user U1a, also automatically is given access to the recording for the conference session. The recording server 14 will refer to the location/identification server 20 to determine which higher level persons will automatically be granted access to a recording for a conference session involving lower level employees within their direct report structure, for example. In accordance with another variation, the metadata associated with the recording includes a policy regarding who may be allowed to replay the recording as described above in connection with FIG. 5. Likewise, the recording server 14 may be configured to allow the manager of user U1a access to any muted recordings (sidebars) involving user U1a during a conference session. Thus, if user U1a has access privileges to the sidebar recording, then the recording server 14 will allow user U1a's manager access to the sidebar recording. Further still, the recording server 14 may be configured to allow certain senior managers automatic access to recorded data for any conference sessions that involve certain topics or subject areas that are within their management responsibility. Thus, the subject matter of the conference session and the presence of one or more participants may be used by the recording server 14, with assistance from the location/identification server 20, as a trigger to allow access to a senior manager to all conference sessions (and their associate sidebar sessions) for a particular topic or subject matter.

Turning now to FIG. 9, an example of a "digital white-out" is shown at 500. A "digital white-out" technique is an optional but useful technique to prevent access to users or parties of video data associated with a sidebar recording during playback of the video associated with a muted sidebar session during a conference session. This also may be used in real-time when forwarding and rendering the video portion of otherwise muted multimedia from a particular endpoint to other endpoints. For example, in FIG. 7, when playing back the recorded data for sidebar 220 or when forwarding the multimedia from a particular endpoint during sidebar 220, the recording server 14 modifies the video data for the video frames (an example of which is shown at 500) for sidebar 220 when played back to any user other than users U3a and U3b (or forwarded to other participants in real-time during the conference session) to obscure the movement of the lips of users U3a and U3b. The lips of user U3a is obscured by a digitally generated graphical "white-out" element 510 superimposed on the video frame at the location of the lips of user U3a (using well known video recognition and editing techniques). Similarly, a graphical "white-out" element 520 is superimposed on the video frame at the location of the lips of user U3b. The color of the elements 510 and 520 may be generated to blend in with the color of the faces of users U3a and U3b. The graphical elements 510 and 520 shown in FIG. 9 are therefore only meant to illustrate the fact that the lips of the users U3a and U3b are obscured so that when the video for a sidebar session is played back to users who do not have access privileges to the multimedia data for that sidebar session, those users cannot discern the words being spoken by the people speaking to each other during the muted sidebar session. When users U3a and U3b, or any other persons who have access privileges to the sidebar recording 220, view the content for the sidebar recording, the recording server 14 will playback an unmodified version of the video for sidebar recording without the white-out elements. The recording server 14 may generate the modified version of the video for a sidebar session during the conference session, at the time of playback, or during a post-processing period after the recording, but prior to playback to a user.

In sum, a method is provided in which multimedia from a plurality of endpoints participating in a conference session is received. The multimedia received from the endpoints participating in the conference session is recorded and multimedia data representing the recorded multimedia for the conference session is stored. A muting state at a particular endpoint is detected indicating that multimedia from the particular endpoint is not to be forwarded to the other endpoints participating in the conference session but that multimedia from the particular endpoint during the muting state is to be recorded. Information associated with the multimedia data is stored to indicate the muting state detected at the particular endpoint.

Similarly, a computer-readable memory medium is provided that stores instructions that, when executed by a processor, cause the processor to receive multimedia from a plurality of endpoints participating in a conference session, record and store the multimedia received from the plurality of endpoints, detect a muting state at a particular endpoint that indicates that multimedia from the particular endpoint is not to be forwarded to the other endpoints but that the multimedia at the particular endpoint during the muting state is to be recorded, and to store information associated with the multimedia data to indicate the muting state detected at the particular endpoint.

Additionally, an apparatus is provided comprising a network interface unit configured to receive multimedia from a plurality of endpoints participating in a conference session and a processor configured to be coupled to the network interface unit. The processor is configured to receive the multimedia from the plurality of endpoints, record and store the multimedia received from the plurality of endpoints for the conference session, detect a muting state at a particular endpoint that indicates that multimedia from the particular endpoint is not to be forwarded to the other endpoints but that the multimedia from the particular endpoint during muting state is to be recorded, and to store information associated with the multimedia data to indicate the muting state detected at the particular endpoint.

The above description is intended by way of example only.

What is claimed is:

1. A method comprising:
   at a recording server that is in communication with a plurality of endpoints in a conference session, receiving multimedia from the plurality of endpoints participating in the conference session;
   at the recording server, recording multimedia received from the endpoints participating in the conference session and storing multimedia data representing recorded multimedia for the conference session;
   detecting a muting state at a particular endpoint, the muting state indicating that multimedia from the particular endpoint is not to be forwarded to the other endpoints participating in the conference session but that the multimedia during the muting state at the particular endpoint is to be recorded; and
   storing information associated with the multimedia data to indicate the muting state detected at the particular endpoint.

2. The method of claim 1, wherein storing information further comprises storing access information indicating one or more persons who participated at the particular endpoint during the muting state.

3. The method of claim 2, and further comprising acquiring a plurality of identifiers for each of a plurality of participants at each of the endpoints participating in the conference session, and wherein storing access information comprises storing identifiers for the participants in the conference session at the particular endpoint.

4. The method of claim 3, and further comprising generating at least one of an audio signature and video signature for each of the plurality of participants based on audio or video of the respective participants captured during the conference session for use as the identifier for the respective participant, and wherein storing access information comprises storing at least one of an audio and video signature for each of the participants at the particular endpoint.

5. The method of claim 2, wherein storing access information further comprises information for a policy regarding persons who are not participants at the particular endpoint during the muting action but who are granted access privileges to the multimedia recorded during the muted state at the particular endpoint.

6. The method of claim 1, wherein recording comprises storing main session multimedia data representing multimedia from the plurality of endpoints excluding the multimedia muted at the particular endpoint during the conference session and sidebar multimedia data representing multimedia from the particular endpoint when the muting state was detected.

7. The method of claim 6, wherein storing information comprises storing metadata including information indicating the participants at each of the endpoints participating in the conference session as having access privileges to the main session multimedia data and information indicating the participants at the particular endpoint as having access privileges to the sidebar multimedia data.

8. The method of claim 7, further comprising:
   receiving a request from a user for access to the recorded data for the conference session;
   comparing an identifier of the user with the metadata to determine whether the user has access privileges to the main session multimedia data and to determine whether the user has access privileges to the sidebar multimedia data.

9. The method of claim 7, and further comprising rendering the sidebar multimedia data to a user that is determined to have access privileges to the sidebar multimedia data, wherein rendering comprises rendering the sidebar multimedia data simultaneously with the main session multimedia data or separate from rendering of the main session multimedia data.

10. The method of claim 1, wherein the conference session is a video conference session, and wherein recording comprises recording video from the plurality of endpoints and storing video data, and further comprising modifying the video data from the particular endpoint during the time interval that multimedia is muted at the particular endpoint so as to obscure the movement of lips of one or more participants who are speaking during the muting state at the particular endpoint.

11. A non-transitory computer-readable memory medium storing instructions that, when executed by a processor, cause the processor to:
  receive multimedia from a plurality of endpoints participating in a conference session;
  record and store the multimedia received from the plurality of endpoints participating in the conference session;
  detect a muting state at a particular endpoint, the muting state indicating that multimedia from the particular endpoint is not to be forwarded to the other endpoints participating in the conference session but that the multimedia at the particular endpoint during the muting state is to be recorded; and
  store information associated with the multimedia data to indicate the period of time during which the muting state was detected at the particular endpoint.

12. The non-transitory computer-readable memory medium of claim 11, wherein the instructions that cause the processor to store information associated with the multimedia data comprise instructions that cause the processor to store access information indicating one or more persons who participated at the particular endpoint during the muting state.

13. The non-transitory computer-readable memory medium of claim 12, and further comprising instructions that cause the processor to acquire a plurality of identifiers for each of a plurality of participants at each of the endpoint participating in the conference session, and wherein instructions that cause the processor to store access information comprise instructions that cause the processor to store identifiers for the participants in the conference session at the particular endpoint.

14. The non-transitory computer-readable memory medium of claim 12, and further comprising instructions that cause the processor to generate at least one of an audio signature and video signature for each of the plurality of participants based on audio or video of the respective participants captured during the conference session for use as the identifier for the respective participant, and wherein instructions that cause the processor to store access information comprise instructions that cause the processor to store at least one of an audio and video signature for each of the participants at the particular endpoint.

15. The non-transitory computer-readable medium of claim 12, wherein the instructions that cause the processor to store access information comprise instructions that cause the processor to store information for a policy regarding persons who are not participants at the particular endpoint during the muting action but who are granted access privileges to the multimedia recorded during the muted state at the particular endpoint.

16. The non-transitory computer-readable memory medium of claim 11, wherein the instructions that cause the processor to record multimedia received from the endpoints further comprise instructions that cause the processor to store main session multimedia data representing multimedia from the plurality of endpoints excluding the multimedia muted at the particular endpoint during the conference session and sidebar multimedia data representing multimedia at the particular endpoint when the muting state was detected.

17. The non-transitory computer-readable memory medium of claim 16, wherein the instructions that cause the processor to store information associated with the multimedia data comprise instructions that cause the processor to store metadata including information indicating the participants at each of the endpoints participating in the conference session as having access privileges to the main session multimedia data and information indicating the participants at the particular endpoint as having access privileges to the sidebar multimedia data.

18. An apparatus comprising:
  a network interface unit configured to receive multimedia from a plurality of endpoints participating in a conference session;
  a processor configured to be coupled to the network interface unit, wherein the processor is configured to:
    receive the multimedia from the plurality of endpoints;
    record and store the multimedia received from the plurality of endpoints for the conference session;
    detect a muting state at a particular endpoint, the muting state indicating that multimedia from the particular endpoint is not to be forwarded to the other endpoints participating in the conference session but that the multimedia at the particular endpoint during the muting state is to be recorded; and
    store information associated with the multimedia data to indicate the muting state detected at the particular endpoint.

19. The apparatus of claim 18, wherein the processor is configured to store information comprising access information indicating one or more persons who participated at the particular endpoint during the muting state.

20. The apparatus of claim 19, wherein the processor is further configured to generate at least one of an audio signature and video signature for each of the plurality of participants based on audio or video of the respective participants captured during the conference session for use as the identifier for the respective participant, and to store the access information comprising at least one of an audio and video signature for each of the participants at the particular endpoint.

21. The apparatus of claim 19, wherein the processor is configured to store access information comprise information for a policy regarding persons who are not participants at the particular endpoint during the muting action but who are granted access privileges to the multimedia recorded during the muted state at the particular endpoint.

22. The apparatus of claim 18, wherein the processor is configured to record and store the multimedia data for the conference session comprising multimedia from the plurality of endpoints excluding the multimedia muted at the particular endpoint and multimedia data representing multimedia at the particular endpoint when the muting state was detected.

23. The apparatus of claim 18, wherein the processor is configured to detect the muting state based on a signal received from the particular endpoint indicating that a mute button is pressed at the particular endpoint.

* * * * *